US010974326B2

(12) United States Patent
Ziegelmeyer (10) Patent No.: US 10,974,326 B2
(45) Date of Patent: Apr. 13, 2021

(54) DRILLING APPARATUS FOR WORKING ON TUBES IN A RADIOACTIVE ENVIRONMENT (71) Applicant: Westinghouse Electric Germany GmbH, Mannheim (DE)

(72) Inventor: Fritz Ziegelmeyer, Bad Schoenborn (DE)

(73) Assignee: Westinghouse Electric Germany GmbH, Mannheim (DE)

( * ) Notice: Subject to any disclaimer, the term of this patent is extended or adjusted under 35 U.S.C. 154(b) by 154 days.

(21) Appl. No.: 16/345,720

(22) PCT Filed: Nov. 7, 2017

(86) PCT No.: PCT/EP2017/001292
§ 371 (c)(1),
(2) Date: Apr. 28, 2019

(87) PCT Pub. No.: WO2018/086734
PCT Pub. Date: May 17, 2018

(65) Prior Publication Data
US 2019/0299301 A1    Oct. 3, 2019

(30) Foreign Application Priority Data
Nov. 8, 2016  (DE) ..................... 10 2016 013 245.0

(51) Int. Cl.
*B23B 41/10*     (2006.01)
*F22B 37/00*     (2006.01)
*G21C 19/02*     (2006.01)

(52) U.S. Cl.
CPC ............ *B23B 41/10* (2013.01); *F22B 37/005* (2013.01); *G21C 19/02* (2013.01); *F22B 37/006* (2013.01)

(58) Field of Classification Search
CPC . B23B 41/10; B23B 2247/04; B23B 2247/12; B23B 41/00; F22B 37/005;
(Continued)

(56) References Cited

U.S. PATENT DOCUMENTS 4,363,592 A * 12/1982 Tedder .................. F22B 37/005
414/590
4,373,855 A   2/1983 Lebouc
(Continued)

FOREIGN PATENT DOCUMENTS

DE        3840569 A1    6/1989
DE   10 2010 039413 A1    2/2012
(Continued)

OTHER PUBLICATIONS

International Preliminary Report on Patentability for PCT/EP2017/001292, dated May 14, 2019.
(Continued)

*Primary Examiner* — Eric A. Gates
*Assistant Examiner* — Paul M Janeski
(74) *Attorney, Agent, or Firm* — Katterle Nupp LLC; Paul Katterle; Robert Nupp (57) ABSTRACT The present disclosure relates to a drilling instrument for machining tubes in tube sheets of heat exchangers in a radioactive environment, comprising a transport device having clamping elements and having a drilling device with clamping fingers, which are arranged in each case on a common first side. The transport device and the drilling device are connected to a support device having a support plate on which a resting plate of the drilling device rests. In addition, the support plate is connected to the resting plate by way of at least one movable connecting element, and the resting plate is connected to the support plate in a play-free manner in a first position of the connecting element, wherein
(Continued)

the resting plate exhibits predefinable play with regard to the carrier plate in a second position of the connecting element.

19 Claims, 4 Drawing Sheets

(58) Field of Classification Search
CPC ...... F22B 37/003; F22B 37/006; G21C 19/02; Y02E 30/30
See application file for complete search history.

(56) References Cited

U.S. PATENT DOCUMENTS

| | | | |
|---|---|---|---|
| 4,406,856 A | 9/1983 | Wilkins | |
| 4,639,994 A | 2/1987 | Cooper, Jr. | |
| 4,688,327 A | 8/1987 | Cooper, Jr. | |
| 4,718,377 A | 1/1988 | Haller | |
| 4,937,933 A * | 7/1990 | Dietrich | F22B 37/003 138/98 |
| 5,070,592 A | 12/1991 | Sugata | |
| 5,109,915 A * | 5/1992 | Osusko | F22B 37/003 165/11.2 |
| 6,282,461 B1 | 8/2001 | Gan | |
| 9,273,985 B2 | 3/2016 | O'Dell | |
| 10,821,524 B2 * | 11/2020 | Ziegelmeyer | B23B 41/00 |
| 2004/0131462 A1 | 7/2004 | Hawkins | |
| 2019/0299300 A1 | 10/2019 | Ziegelmeyer | |

FOREIGN PATENT DOCUMENTS

| | | |
|---|---|---|
| EP | 0480382 A1 | 4/1992 |
| JP | H10 227765 A | 8/1998 |

OTHER PUBLICATIONS

Written Opinion of the International Searching Authority, transmitted Mar. 23, 2018.
International Search Report, transmitted Mar. 23, 2018.

* cited by examiner

DRILLING APPARATUS FOR WORKING ON TUBES IN A RADIOACTIVE ENVIRONMENT

CROSS REFERENCE TO RELATED APPLICATIONS

This application is the U.S. national phase of PCT Application No. PCT/EP2017/001292 filed Nov. 7, 2017, which claims priority to German Patent Application No. 10 2016 013 245.0 filed Nov. 8, 2016, the disclosures of which are incorporated in their entirety by reference herein.

TECHNICAL FIELD

The present embodiments generally relate to a drilling instrument for machining tubes in tube sheets of heat exchangers in a radioactive environment.

BACKGROUND

In nuclear power plants, maintenance work and, if necessary, repairs are carried out at regular intervals. At the same time, there are areas in the nuclear power plant that are exposed to radioactive radiation and themselves emit radioactive radiation after some time. The maintenance work and repairs also need to be carried out in this radioactive environment, for example at steam generator tubes or heat exchanger tubes. For people, the radioactive environment is unsuitable and accessible at most briefly. Moreover, according to legal requirements, exposure of personnel and material to radiation has to be as low as possible and may not exceed a particular upper limit. In this regard, the use of a quantity of material that is as small as possible is desirable. In these areas, remote-controllable machine tools or test equipment are also used.

In order to repair tubes that are held in tube sheets, it is possible to use a drilling machine that is mounted on a robot arm of a robot such that the drilling machine is positioned with the robot arm at that point of the tube sheet in the radioactive environment that is to be machined, as is shown in U.S. Pat. No. 6,282,461B1. A drawback of this system is that the drilling machine can be used only in the working range of the robot arm. If a large number of points on a tube sheet are intended to be machined, first of all the robot has to be moved to a different point so that the point to be machined can again be reached by the robot arm. This is relatively complicated. In addition, on account of the robot arm, the mass of the robot is correspondingly high. Alternatively, the robot arm can be constructed to be so large that the working range corresponds to the extent of the tube sheet. Then, the mass of the repair robot is even greater and the construction or dismantling of the robot is particularly complicated.

One possibility of moving over a relatively large area of the tube sheet of a steam generator or heat exchanger in a nuclear power plant is provided by a known inspection robot "PEGASYS" from the company Westinghouse, USA. Said robot moves a probe in a walking manner to the desired point on the tube sheet that is to be checked in that a group of retaining devices are alternately anchored in the tubes of the tube sheet or released therefrom and in the process travel into new tubes and are again anchored there. The inspection robot does not have a component comparable to the robot arm and is accordingly lighter. A drawback of the inspection robot, however, is that the mechanics thereof, on account of the movable parts, exhibit a comparatively high level of inaccuracy in the positioning of the probe, which, although being sufficient for measuring, is not suitable for the unrelated machining of tubes with a drilling machine, which also cannot be corrected manually. Specifically, correction possibilities for positioning the inspection robot are not provided in the plane of the tube sheet or perpendicularly to this plane.

Proceeding from this, it is an object of the present disclosure to specify a drilling instrument which reaches a large number of working positions on a tube sheet as easily as possible, has a mass that is as low as possible, and has sufficient accuracy for machining tubes.

BRIEF DESCRIPTION OF THE DRAWINGS

In the accompanying drawings, structures are illustrated that, together with the detailed description provided below, describe exemplary embodiments of the claimed apparatus. The drawings are provided for purpose of illustration only and merely depict aspects of typical or example embodiments. These drawings are provided to facilitate the reader's understanding of the disclosure and shall not be considered limiting of the breadth, scope, or applicability of the disclosure.

The elements in the drawing are not necessarily drawn to scale and the proportion of certain elements may be exaggerated for the purpose of illustration. In the drawings, like reference numerals designate corresponding elements throughout the several views. One of ordinary skill in the art will appreciate that elements shown as a single component may be replaced with multiple components, and elements shown as multiple components may be replaced with a single component.

DETAILED DESCRIPTION

It should be understood that aspects, features or functions that are described in relation to an embodiment are not necessarily limited to the embodiment described, but rather may be applicable to one or more embodiments, unless expressly described otherwise. Also, the description set forth herein is not to be construed as limited to the embodiments shown. Rather, it is appreciated that various modifications may occur to those skilled in the art that, while not specifically set forth herein, are nevertheless within the spirit and scope of the description. When an embodiment is described as "exemplary" herein, it is to be understood as one non-limiting example embodiment and does not preclude other embodiments that may not include the limitations described in the exemplary embodiment.

The present disclosure describes and illustrates one or more novel embodiments of a drilling instrument for machining tubes in tube sheets of heat exchangers in a radioactive environment, having a transport device having clamping elements. In one or more embodiments, the drilling instrument comprises a drilling device having clamping fingers and is held by the transport device. The clamping elements and the clamping fingers are arranged on a common first side of the drilling device and of the transport device. The transport device and the drilling device are connected to a support device, and the support device has a support plate on which a resting plate of the drilling device rests. The support plate is connected to the resting plate by way of at least one movable connecting element. The resting plate is connected to the support plate in a play-free manner in a first position of the connecting element. The resting plate exhibits predefinable play with regard to the carrier plate in a second position of the connecting element.

The embodiments described herein have a transport device having clamping elements for locomotion. With the transport device, it is possible to move the drilling device in principle to any tube or into any working position on a tube shell, in that the clamping elements of the transport device are clamped in or released from tubes individually or in groups according to a particular predefinable method. In addition, the transport device also ensures a relative movement of the clamping elements with respect to one another and in this way locomotion over the tube sheet. Locomotion over a tube sheet is already known per se, for example from the inspection robot "PEGASYS". The drilling device according to the embodiments herein is rigidly connected to the transport device during the transport operation in that the connecting element remains in the first position during transport. The connecting element is moved into the second position following arrival, such that the transport device firmly clamped to the tube sheet is connected with play to the drilling device, with axial and/or radial play with regard to the connecting element. This play allows the drilling device to introduce the clamping fingers into tubes of the tube sheet and to fasten, in particular clamp, them there. In this case, the play is such that the drilling device is clamped in the tubes at the tube sheet without forces being transmitted to the transport device as a result. Possible inaccuracies in the positioning of the drilling device by the transport device are compensated by the play. This is because, as a result of the movable parts of the transport device, it is possible for inaccuracies in the typical range of up to 2.5 mm or 3 mm to arise. The rigid frame structure of the drilling device is set up such that the machining position of a tool in the drilling device has the required accuracy when the clamping fingers are clamped properly in the tubes.

In a development of the drilling instrument according to one or more embodiments disclosed herein, the transport device has, on the first side, at least four retaining elements, which are subdivided into two groups, each group is controllable separately, a first group of retaining elements is pivotable with respect to a second group of retaining element, and one group of retaining elements is displaceable with a linear movement. In this way, two movements are possible in the transport device. Firstly, the two groups of retaining elements are allowed to pivot with respect to one another. Thus, the transport device is rendered capable of changing direction. Secondly, one group of retaining elements is allowed a linear movement. In this way, it is possible for the transport device to be moved incrementally along a straight line. The two movement possibilities are sufficient to allow the transport device to reach each desired point on the tube sheet particularly easily with the drilling device.

One advantageous configuration of the drilling instrument is when the drilling device has at least two retaining fingers, and when the retaining elements and the at least two retaining fingers are movable in a direction perpendicular to the first side. This has the particularly favorable result that those retaining elements or retaining fingers are movable into or out of the tubes, depending on requirements. If the retaining elements or retaining fingers are moved for example completely out, no components that could catch in the tube sheet protrude from the first side.

In a further configuration of the drilling instrument, the support plate or the resting plate has at least one limiting element which is arranged in a recess, and the shape of the recess allows play in the second position of the connecting element. Such a design measure advantageously has the result that the maximum play between the support plate and resting plate is limited. In this way, the play can also be adapted particularly easily to the requirements.

In a further development of the drilling instrument, the connecting element has a drive device, in particular a pneumatic or hydraulic drive device, by way of which the connecting element is movable selectively into the first or second position.

In one or more embodiments, a cylindrical component is arranged on the support plate, and a force is able to be exerted on the resting plate by the cylindrical component. In embodiments, the resting plate is movable by a predefinable distance in the direction of the second position. This ensures that the resting plate is spaced apart from the support plate and thus the play for compensating for positional inaccuracies is also present. This is because, although it is possible for the connecting element to be brought into the second position, the resting plate remains on the support plate. In such a case, there would also be no play since then the centering pins do not allow any play.

In preferred embodiments, the force is introduced into the resting plate in a region of an imaginary line which is perpendicular to the first side and passes through the center of gravity of the drilling device. This condition ensures that the drilling device is applied uniformly to the tube sheet, i.e. that spacer elements that are present for example are applied to the tube sheet virtually at the same time. An undesired inclined position of the drilling device is avoided.

The following table lists elements of the illustrated embodiments of the disclosure and their associated reference numbers for convenience.

| Ref. No. | Element |
| --- | --- |
| 10 | Drilling instrument |
| 12 | Transport instrument |
| 14 | Carrier element/support device |
| 16 | Drilling device |
| 18 | First retaining elements |
| 20 | Struts |
| 22 | Housing |
| 24 | Second retaining elements |
| 26 | Motor |
| 28 | Retaining plate |
| 30 | Retaining finger |
| 32 | Tool holder |
| 34 | Machining axis |
| 40 | Spacing studs |
| 42 | Axis of symmetry |
| 44 | Retaining-element housing |
| 46 | Strut drive |
| 48 | Plate carrier |
| 50 | Support plate |
| 52 | Screws |
| 54 | Lateral arms |
| 56 | Centering element |
| 58 | Limiting pin |
| 60 | Cylinder pin |
| 62 | Connecting element |
| 64 | Tube sheet |
| 66 | Tubes |
| 68 | Spacers |

| Ref. No. | Element |
| --- | --- |
| 70 | Chamfer |
| 72 | First spacing |
| 74 | Limit switch |
| 76 | Pneumatic drive |
| 78 | Pneumatic cylinder |
| 80 | Spring |
| 84 | Retaining-finger drive |
| 86 | Spreading elements |
| 88 | Ring |

Figure 1:
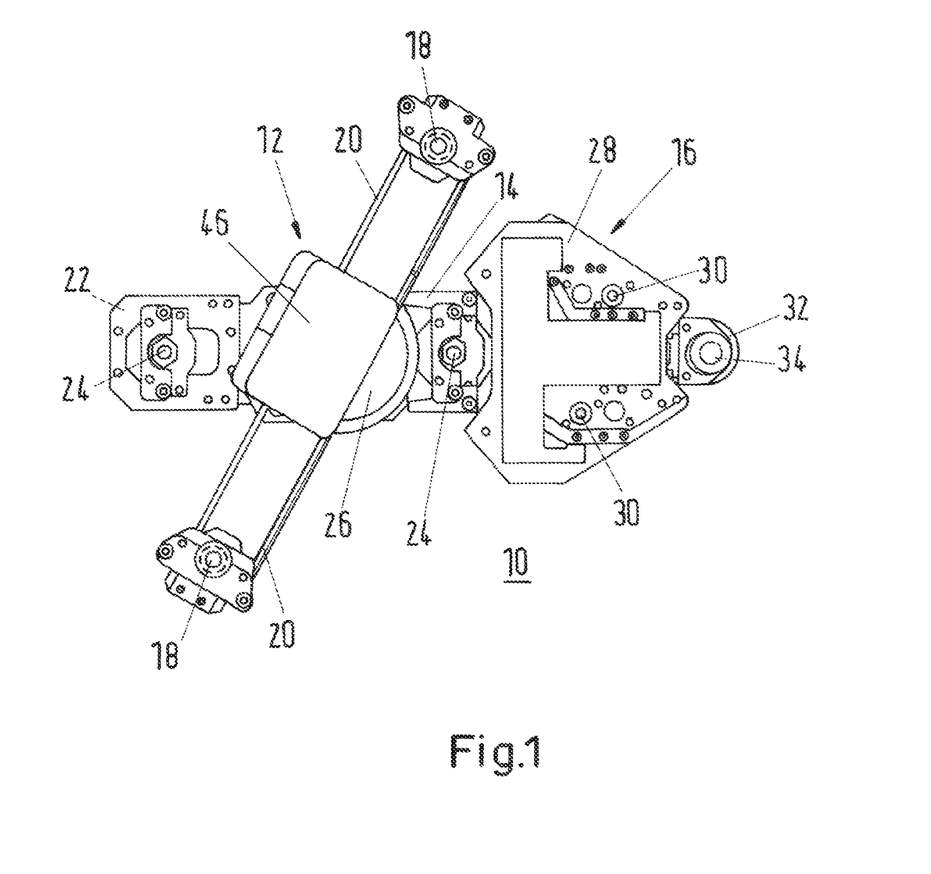
FIG. 1 is a schematic drawing illustrating a plan view of one embodiment of an apparatus according to the embodiments described herein, comprising a drilling instrument.

FIG. 1 shows a plan view of an exemplary embodiment of a drilling instrument 10 according to the disclosure herein, in which a transport instrument 12 is connected to a drilling device 16 by a carrier element 14. In this case, the plan view shows the side which faces a tube sheet during machining. The transport instrument 12 has two first retaining elements 18, which are connected and spaced apart from one another by struts 20. A housing 22 of the transport instrument 12 has two second retaining elements 24. By way of a strut drive 46, the struts 20 are movable back and forth such that the spacing between the first retaining elements 18 and the strut drive 46 is changed as required. In addition, the first retaining elements 18 can be rotated or pivoted through a predefinable angle relative to the second retaining elements 24 by a motor 26. The pivoting can also take place the other way round, namely in that the second retaining elements 24 may be pivoted through a predefinable angle relative to the first retaining elements 18 by the motor 26. An axis of rotation of the rotary movement is perpendicular to the illustration in this plan view.

The drilling device 16 has a retaining plate 28, which has cutouts through which two retaining fingers 30 engage. The spacing of the two retaining fingers 30 is in this case dimensioned such that these are coordinated with the spacings of the tubes in the tube sheet. The name tube sheet is intended here to refer to all tube sheets which are present in heat exchangers or steam generators of nuclear power plants. Typical tube diameters for such tube sheets are 12 mm to 22 mm. In some cases, tube diameters that differ therefrom also occur. The diameters of the part of the retaining fingers 30 that is clamped in the tubes are coordinated with the different tube diameters. The spacing of the cutouts in the retaining plate 28 is also coordinated with the spacings of the tubes in the respective tube sheet. A tool holder 32 projects laterally beyond the retaining plate 28 in this figure. The spacings between a machining axis 34 of a tool in the tool holder 32 and the retaining fingers 30 are also structurally predefined such that the machining is able to be carried out with sufficient accuracy with a tool at a predefinable point.

Figure 2:
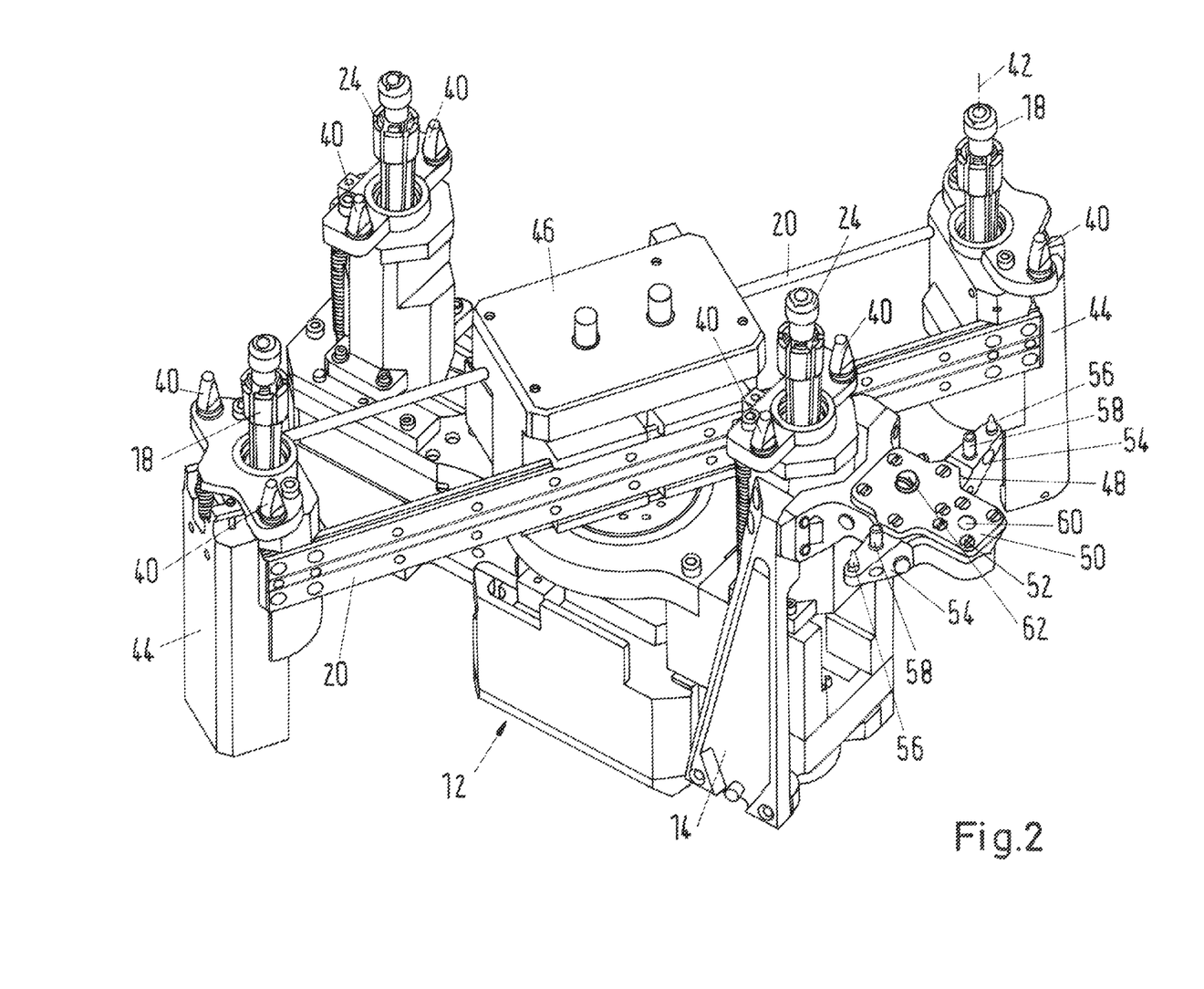
FIG. 2 is a schematic drawing illustrating a perspective view of a transport instrument with the carrier element of the drilling instrument apparatus of FIG. 1.

FIG. 2 shows a perspective view of the transport instrument 12 with the carrier element 14 of the drilling instrument 10. Assigned to each retaining element 18, 24 are two spacing studs 40, which ensure that the transport instrument 12 is at a predefined spacing from the tube sheet. Specifically, the first retaining elements 18 are pivotable about a pivot axis via the second retaining elements 24 and are also movable back and forth along a respective axis of symmetry 42. The locomotion of the transport instrument 12 then takes place as follows. In a starting position, the second retaining elements 24 are intended to be clamped in a tube sheet. In this case, the two second retaining elements 24 and the spacing studs 40 bear on the tube sheet. The first retaining elements 18 have been retracted into a retaining-element housing 44 to such an extent that, during a movement of the transport instrument 12 of the first retaining elements 18 the tube sheet is not touched. The retaining fingers 30, too, have a functionality comparable to that of the retaining elements 18, 24 and have been retracted in the transport phase of the drilling instrument. The drilling device 16 is not illustrated in this figure, however. Now, the first retaining elements 18 are moved along the struts 20 with a strut drive 46 by an amount predefined by a controller. The controller in this case optimizes the movement such that the transport target of the drilling instrument 10 is reached with as few transport steps as possible. For a change in direction, the first retaining elements 18 are pivotable with respect to the second retaining elements 24. Once the first retaining elements 18 have reached their position, they are extended out of the retaining-element housing 44 and into a tube of the tube sheet and clamped there. Once the first retaining elements 18 have been clamped properly in the tubes, the transport instrument 12 and thus the drilling instrument 10 is secured in its position by the first retaining elements 18, such that the second retaining elements 24 are released and retracted into the retaining-element housing 44. In the method step that now follows, the strut drive 46 moves the transport instrument 12 along the struts 20 to a new point on the tube sheet. There, the second retaining elements 24 are extended again and clamped in tubes. The first retaining elements 18 are released and retracted back into the retaining-element housing. Subsequently, the strut drive 46 moves the first retaining elements 18 to a new position. In this way, the starting situation of the moving method is re-established, but the drilling instrument 10 has been moved by a particular distance from the original position. This procedure is repeated until the desired target position of the drilling instrument 12 has been reached. As a result of the transport instrument 12 being pivoted or rotated about the axis of rotation, the drilling device 16 is positionable at a desired point.

With continued reference to FIG. 2, carrier element 14 has a plate carrier 48, on which a support plate 50 is arranged and is connected to the plate carrier 48 by several screws 52. The support plate is arranged parallel to the tube sheet and on that side of the drilling instrument 10 that faces the tube sheet. The plate carrier 48 also has two lateral arms 54, on each of which a centering cone 56 and a limiting pin 58 are arranged. Also attached to the plate carrier 48 is a first drive, by way of which a cylinder pin 60 is movable, if required, through a cutout in the support plate 48 in the direction of the tube sheet. In addition, a connecting element 62 on the support plate 50 is shown, the function of which is explained in more detail in FIG. 4.

Figure 3:
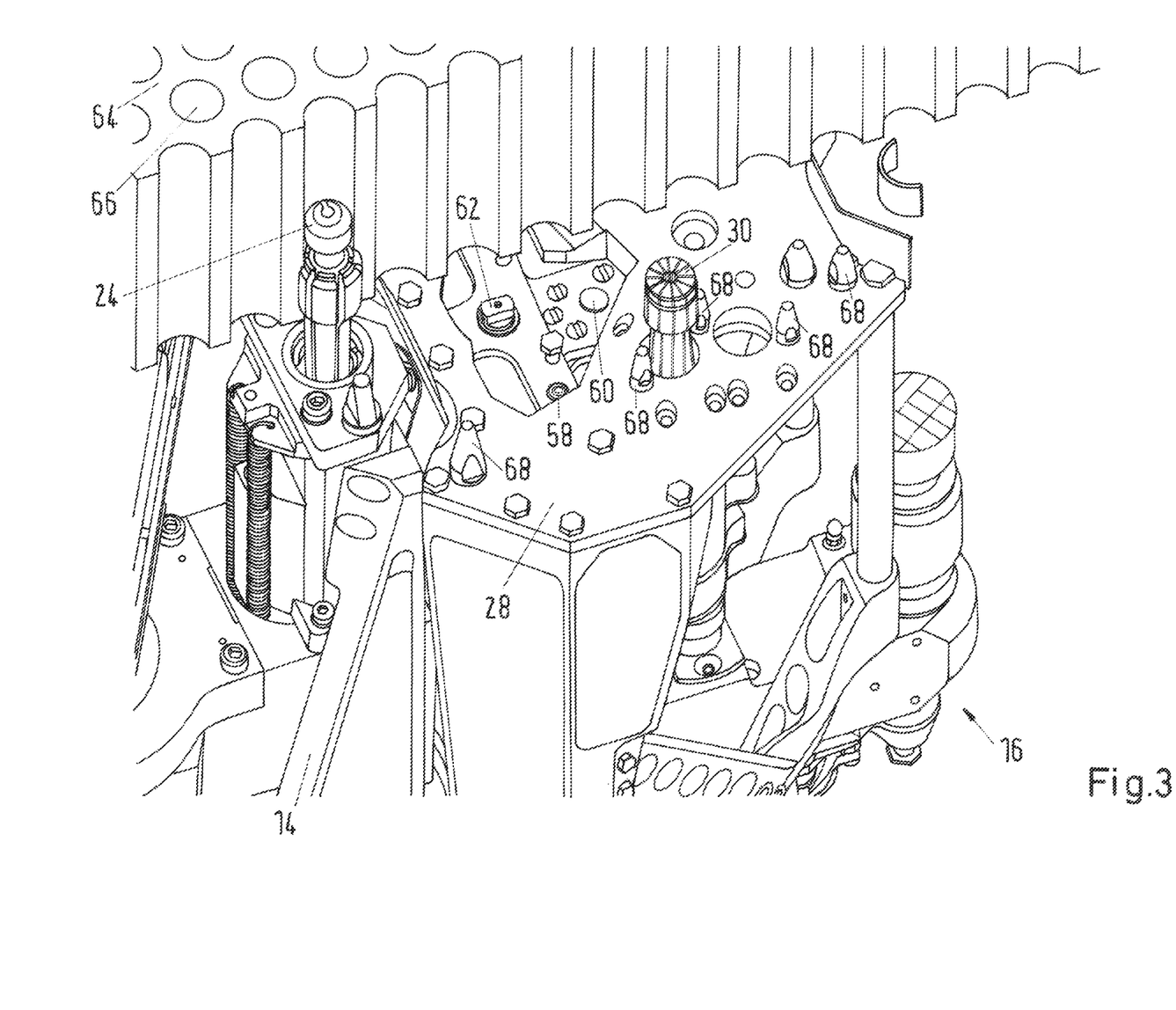
FIG. 3 is a schematic drawing illustrating a perspective view of a region around the carrier element.

FIG. 3 shows a magnified perspective view of a region around the carrier element 14 at a tube sheet 64 with tubes 66. In order to make it easier to discern different components, a region of the retaining plate 28 and a part of the tube sheet 64 have been cut away. The retaining plate 28 has spacers 68, which have a comparable function for the drilling device 16 as the spacing studs 40 have for the transport instrument 12. Moreover, in this figure, one of the two retaining fingers 30 is discernible, wherein said retaining finger 30 has a chamfer 70 on its side facing the tube sheet 64. The chamfer 70 is dimensioned so as to make insertion into a tube 66 easier, even when the tube central axis and the central axis of the retaining finger 30 are offset from one another within the range of inaccuracy during positioning by the transport instrument 12. The introduction of the retaining finger 30 into a tube 66 is allowed in this way even if the central axis deviates from parallelism within the inaccuracy. As a result of the introduction of the retaining finger 30, the position of the central axis thereof is changed until it is parallel with the tube central axis.

Figure 4:
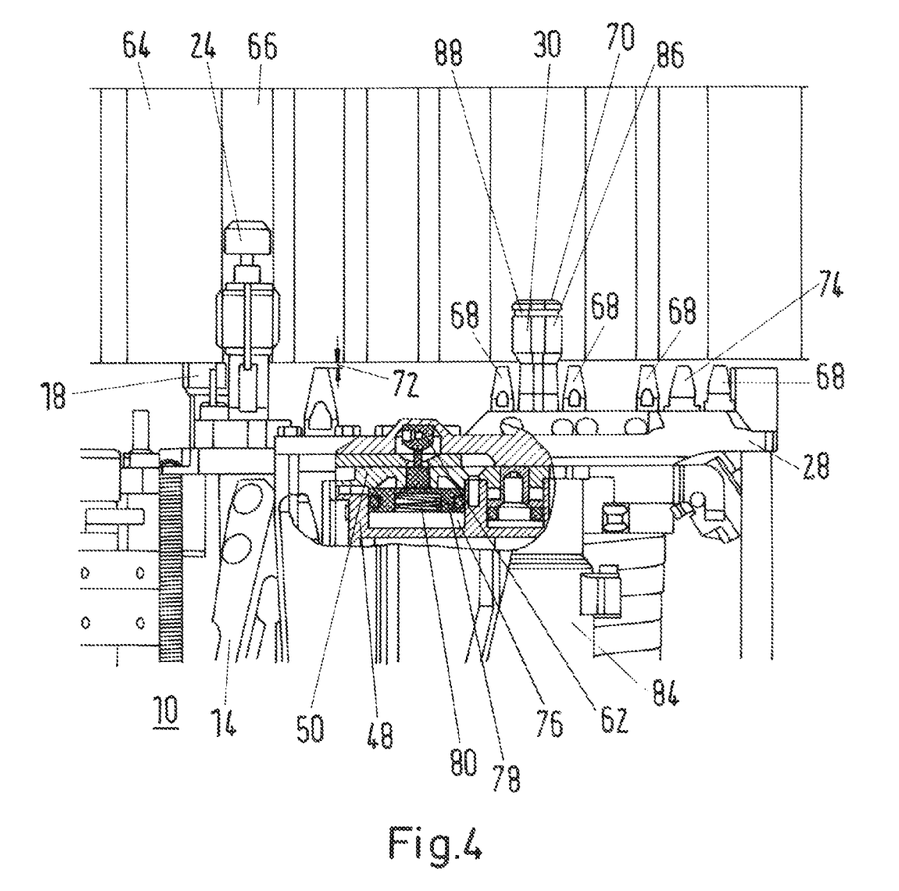
FIG. 4 is a schematic drawing illustrating a side view of a sub-region of the drilling instrument at a tube sheet.

FIG. 4 shows a side view of a region of the drilling instrument 10 and the tube sheet, wherein a subregion of the figure is shown as a cutaway section through the drilling device 16 and the tube sheet 64. The drilling instrument 10 is held by the second retaining elements 24, which have been clamped in tubes 66 of the tube sheet 64, while the first retaining elements 18 are arranged only partially in tubes 66 and are accordingly not clamped. Arranged on the retaining plate 28 are a number of spacers 68, which are at a spacing 72 of about 2 mm from the tube sheet 64 in this figure. Accordingly, the drilling device 16 does not yet bear on the tube sheet 64, this being able to be indicated by a limit switch 74, which is likewise arranged on the retaining plate 28.

The connecting element 62 is movable by a pneumatic drive 76, which has a pneumatic cylinder 78 with which the movement force is able to be applied to the connecting element 62. The pneumatic cylinder 78 in this case works counter to a spring force of a spring 80, wherein the figure shows the pneumatic cylinder 78 in an unpressurized second position, in which the spring moves the connecting element 62 away from the support plate 50, such that the retaining plate 28 is movable with play with respect to the support plate 50. The second spacing, shown in this figure, between the support plate 50 and the retaining plate 28 is 0 mm, however, and so the possible play has not yet been used.

In one or more embodiments, the drilling device 16 is intended to be moved to a working position by the transport instrument 12. The spacers 68 are then only about 2 mm away from the tube sheet. The retaining fingers 30 and the cylinder pin 60 are in this case retracted and the pneumatic cylinder 78 is pressurized with compressed air. When the pneumatic cylinder 78 is pressurized with compressed air, the connecting element 62 is located in a first position in which the retaining plate 28 is held on the support plate 50 in a play-free manner. The centering cones 56 are positioned in the first position in the corresponding centering cutouts in the retaining plate 28 and in this way ensure that the retaining plate 28 is located in the structurally predefined position relative to the support plate 50. The first position is also suitable for manual handling with the drilling instrument 10 or for assembling the assembly unit made up of the drilling device 16 and carrier element 14 on the transport instrument 12, since the components of the assembly unit are connected firmly together as if they were one component. In a working step that now follows, the pneumatic cylinder 78 is depressurized such that the spring 80 moves the connecting element 62 into the second position. This allows the drilling device 16 to be released from the support plate 50 and to lean to one side. However, this leaning is limited by the spacers 68 in that—depending on the direction of the inclination—one or more of the spacers 68 are applied to the tube sheet 64. In a next working step, the retaining fingers 30 are retracted into tubes 66 by respective retaining-finger drives 84. In this case, the spreading elements 86 of the retaining finger 30 are kept at a smallest possible diameter of the retaining finger 30 by an elastic ring 88, such that there is radial play that is as large as possible between the retaining fingers 30 and the tubes 66. This situation is shown in FIG. 4. In a further working step, the cylinder pin 60 is extended with a corresponding cylinder-pin drive, such that the retaining plate 28 is lifted and is released from the support plate 50. In this case, the cylinder-pin drive is advantageously set such that the lifting force is only slightly greater than the weight force of the drilling device 16. The force introduction point of the cylinder pin 60 is selected such that the force is introduced in the region of an imaginary line that passes through the center of gravity of the drilling device 16 and is perpendicular to that side of the support plate 50 that faces the tube sheet 64. The advantage of this force introduction point is that the spacers 68 are then applied particularly advantageously to the tube sheet 64. In a working step that now follows, the retaining fingers 30 are braced in the tubes 66 in that the retaining-finger drive 84 moves a cone mandrel in the direction of the spreading elements 86 and presses the latter against the lateral surfaces of the tubes 66 counter to the force action of the elastic ring 88. In this way, the retaining fingers 30 are clamped in the tubes 66. A further advantage of this procedure during clamping is that the retaining fingers 30 are centered in the tubes 66 and with respect to the tubes 66, since the retaining fingers 30 are connected to the retaining plate 28 and thus to the drilling device 16, the drilling device 16 is also itself oriented and at the same time the retaining plate 28 is oriented parallel to the tube sheet 64. Orienting is rendered possible in that, as a result of the retaining plate 28 being released from the support plate 50, the centering cones 56 allow a relative movement of the two plates with respect to one another, wherein the relative movement is limited by the limiting pins 58 and the dimensioning of the cutouts in which the limiting pins are received. As a result of the design of the drilling device 16, the tool, for example a drill bit or milling cutter, is now positioned on the drilling device 16 exactly centrally with respect to the tube 66 to be machined. In a further working step, the retaining fingers 30 are switched back into the retracting operating mode by their retaining-finger drive 84. The spacers 68 prevent retracting, however, and the retaining fingers 30 are also firmly clamped in the tubes 66. Therefore, by way of the tractive force of retraction, the drilling device 16 is pulled up to the tube sheet 64, by 10 kN in the present exemplary embodiment of the subject matter of the present disclosure. This tractive force ensures that the forces that arise during the machining of a tube 66 are absorbed reliably by the drilling device 16. Thus, the feed force for the tool in the exemplary embodiment is 2 kN. In addition, the machining position of the tool is laterally outside the retaining plate 28, such that an additional moment is introduced into the drilling device by machining. In addition, during machining, vibrations and further forces are reliably absorbed by the drilling device 16 and passed into the tube sheet 64. In this case, the pneumatic cylinder 78 is unpressurized and so the connecting element 62 is in the second position. Thus, no forces that arise during machining are transmitted to the transport instrument 12. Following completion of the machining, the above-described working steps are reversed and so the retaining plate 28 is firmly connected to the support plate 50 again by the connecting element 62.

Unless the context clearly requires otherwise, throughout the description and the claims, words using the singular or plural number also include the plural or singular number respectively. Additionally, the words "herein," "above," "below" and words of similar import, when used in this application, refer to this application as a whole and not to any particular portions of this application. "Or" means "and/or." Further, the conjunction "or" covers all of the following interpretations of the word: any of the items in the list, all of the items in the list and any combination of the items in the list. It should further be noted that the terms "first," "second," "primary," "secondary," and the like herein do not denote any order, quantity, or importance, but rather are used to distinguish one element from another.

The various embodiments described above are provided by way of illustration only and should not be construed to limit the scope of the disclosure. Those skilled in the art will readily recognize various modifications and changes that may be made to the principles described herein without following the example embodiments illustrated and described herein, and without departing from the spirit and scope of the disclosure. We therefore claim as our invention all that comes within the scope of these claims.

The invention claimed is:

1. A drilling instrument for machining tubes in tube sheets of heat exchangers in a radioactive environment, comprising:
   a support device;
   a transport device having retaining elements; and
   a drilling device having retaining fingers and a resting plate;
   wherein the transport device, and the drilling device are located proximate to each other and are each connected to the support device, such that the retaining elements and the retaining fingers are arranged on a common first side of the transport device and of the drilling device,
   wherein the support device has a support plate and wherein the resting plate is located proximate to and supported by the support plate,
   wherein the support plate is connected to the resting plate by at least one connecting element that is movable between a first position and a second position,
   wherein the resting plate is fixed in position relative to the support plate when the at least one connecting element is in the first position, and
   wherein the resting plate is movable relative to the support plate when the at least one connecting element is in the second position.

2. The drilling instrument as claimed in claim 1, wherein the transport device has at least four retaining elements on the first side which are subdivided into two groups, wherein each group is controllable separately, wherein a first group of the two groups is capable of pivoting with respect to the second group, and wherein at least one of the two groups is displaceable with a linear movement.

3. The drilling instrument as claimed in claim 2, wherein the drilling device has at least two retaining fingers, and wherein the retaining elements of the transport device and the at least two retaining fingers are movable in a direction perpendicular to the first side.

4. The drilling instrument as claimed in claim 1, wherein the drilling device has at least two retaining fingers, and wherein the retaining elements of the transport device and the at least two retaining fingers are movable in a direction perpendicular to the first side.

5. The drilling instrument as claimed in claim 4, wherein the support plate or the resting plate has at least one limiting element which is arranged in a recess, and in that the shape of the recess allows play in the second position of the connecting element.

6. The drilling instrument as claimed in claim 5, wherein the support plate or the resting plate has at least one approximately conical or frustoconical centering element that is configured to cause the support plate and the resting plate to be arranged in a predefined position with respect to one another when the connecting element is positioned in the first position.

7. The drilling instrument as claimed in claim 4, wherein the support plate or the resting plate has at least one approximately conical or frustoconical centering element that is configured to cause the support plate and the resting plate arranged in a predefined position with respect to one another when the connecting element is positioned in the first position.

8. The drilling instrument as claimed in claim 7, wherein the connecting element has a pneumatic or hydraulic drive device that is configured to cause the connecting element to be movable selectively into the first position or the second position.

9. The drilling instrument as claimed in claim 1, wherein the connecting element has a pneumatic or hydraulic drive device that is configured to cause the connecting element to be movable selectively into the first position or the second position.

10. The drilling instrument as claimed in claim 9, wherein the drive device contains a biasing spring that is configured to cause the resting plate to be held with the support plate in the second position when the drive device is switched off.

11. The drilling instrument as claimed in claim 9, wherein the drive device has a hydraulic or pneumatic drive mechanism configured to apply an opposing force to that of the biasing spring such that the connecting element is movable into the first position by a predefined distance perpendicular to the first side.

12. The drilling instrument as claimed in claim 11, wherein a peg or pin is arranged on the support plate and is operable to apply a lifting force to the resting plate such that the resting plate is capable of being moved a predefined distance in the direction of the second position.

13. The drilling instrument as claimed in claim 9, wherein a peg or pin is arranged on the support plate and is operable to apply a lifting force to the resting plate such that the resting plate is capable of being moved a predefined distance in the direction of the second position.

14. The drilling instrument as claimed in claim 13, wherein the peg or pin applies the lifting force to the resting plate in a location on the surface of the resting plate that is colinear with the center of gravity of the drilling device.

15. The drilling instrument as claimed in claim 14, wherein the lifting force is no more than 10% higher than is necessary to offset the opposing weight force of the drilling device.

16. The drilling instrument as claimed in claim 15, wherein the functions of one or more of the transport device, the drilling device, and the retaining element are controllable by a control device.

17. The drilling instrument as claimed in claim 1, wherein the functions of one or more of the transport device, the drilling device, and the retaining element are controllable by a control device.

18. The drilling instrument as claimed in claim 1, wherein the support plate or the resting plate has at least one limiting element which is arranged in a recess, and in that the shape of the recess allows play in the second position of the connecting element.

19. The drilling instrument as claimed in claim 1, wherein the support plate or the resting plate has at least one approximately conical or frustoconical centering element that is configured to cause the support plate and the resting plate to be arranged in a predefined position with respect to one another when the connecting element is positioned in the first position.

* * * * *